(12) United States Patent
Griesser

(10) Patent No.: US 6,691,059 B1
(45) Date of Patent: Feb. 10, 2004

(54) METHOD AND DEVICE FOR THE DETECTION OF A PRESSURE DROP IN A TIRE OF A VEHICLE WHEEL

(75) Inventor: Martin Griesser, Eschborn (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 18 days.

(21) Appl. No.: 10/049,082

(22) PCT Filed: Jun. 8, 2000

(86) PCT No.: PCT/EP00/05284
§ 371 (c)(1),
(2), (4) Date: Feb. 6, 2002

(87) PCT Pub. No.: WO01/10658
PCT Pub. Date: Feb. 15, 2001

(30) Foreign Application Priority Data

Aug. 6, 1999 (DE) .......................... 199 37 005
Mar. 27, 2000 (DE) .......................... 100 15 230

(51) Int. Cl.[7] .............................. B60C 23/00
(52) U.S. Cl. .................... 702/140; 73/146.2; 73/146.5; 340/444; 340/447; 702/138
(58) Field of Search ................ 702/138, 140, 702/148; 73/146.2, 146.3, 146.4, 146.5; 701/70; 340/442, 443, 444, 445

(56) References Cited

U.S. PATENT DOCUMENTS

| | | | | |
|---|---|---|---|---|
| 4,695,823 A | * | 9/1987 | Vernon ........................ | 340/447 |
| 5,218,862 A | * | 6/1993 | Hurrell, II et al. ......... | 73/146.5 |
| 5,252,946 A | * | 10/1993 | Walker et al. .............. | 340/444 |
| 5,670,716 A | * | 9/1997 | Tamasho et al. ........... | 73/146.2 |
| 5,721,374 A | * | 2/1998 | Siekkinen et al. .......... | 73/146.2 |
| 6,182,021 B1 | * | 1/2001 | Izumi et al. ................ | 702/138 |
| 6,408,690 B1 | * | 6/2002 | Young et al. ............... | 73/146.5 |

FOREIGN PATENT DOCUMENTS

DE      196 19 393      1/1997

* cited by examiner

Primary Examiner—John Barlow
Assistant Examiner—John Le
(74) Attorney, Agent, or Firm—Rader, Fishman & Grauer PLLC

(57) ABSTRACT

A method for the detection of a pressure drop in a tire of a wheel of a vehicle including the steps of determining a test variable from the wheel radii or from variables representing these wheel radii of the wheels of the vehicle, wherein the test variable is a quotient of two sums of each two wheel radii or variables representing these wheel radii of each one pair of vehicle wheels, comparing the test variable with a threshold value, and detecting a pressure drop with respect to the result of the comparison, wherein several test variables are determined with respect to several different wheel pair combinations, and pressure drop is considered to have been identified only if a defined vehicle wheel is identified by all found test variables as a wheel with a possible pressure drop.

14 Claims, 3 Drawing Sheets

| | p1 | p2 |
|---|---|---|
| P1 | 1,3 | 2,4 |
| P2 | 1,2 | 3,4 |
| P3 | 1,4 | 2,3 |

METHOD AND DEVICE FOR THE DETECTION OF A PRESSURE DROP IN A TIRE OF A VEHICLE WHEEL

TECHNICAL FIELD

The present invention relates to a method and a device for the detection of a pressure drop in a tire of a wheel of a vehicle.

BACKGROUND OF THE INVENTION

It is desirable for many reasons to know about the pressure in the individual wheels. On the one hand, it is per se unsafe to drive with insufficient tire pressure so that an information to the driver about insufficient tire pressure on any one or a specific wheel is desirable. In addition, modern driving dynamics control systems are based on defined force transmission mechanisms between roadway and tires. The operating points of the control strategies are rated in conformity with these assumptions. However, in case the tire pressure in a wheel is not correct and especially too low, the preconditions which are the basis of driving dynamics control operations no longer apply, and the said operations are either poorly adapted to the actual situation, or may even be partly detrimental. This means that having knowledge about tire pressure conditions is also desirable to influence control strategies of driving dynamics control in modern automotive vehicles.

Tire pressures may be gathered directly by sensors. However, this necessitates additional effort and structure in sensors and cables. In addition, a serial interface must be provided between the rotating wheel and the stationary, other hardware. This is complicated and frequently also sensitive to disturbances. Another method is directed to deriving tire pressure conditions from the wheel signals. Wheel signals are wheel-related sensor signals which contain an information about the wheel angle speed. These wheel signals are already provided in up-to-date vehicle dynamics control systems because the said signals are required for functions such as ABS or ESP (Electronic Stability Program). The wheel signals may be a pulse sequence having a frequency which is a standard of the rotational speed of the wheel.

The mechanism by which tire pressure conditions may be inferred from the wheel signals is explained by way of FIG. 1. Reference numeral 11 refers to a wheel on a roadway 13. The vehicle moves at a vehicle speed Vf. When in its proper condition, the wheel rotates at the angular speed Wo. Vf and Wo correlate on the basis of the formula Wo=Vf/Ro, wherein $\Delta$Ro is the dynamic rolling radius $\Delta R_{dyn}$ with a normal tire pressure of wheel 11. Reference numeral 12 refers to a wheel with pressure loss. Because the tire pressure is lower, the wheel load, however, remains equal in a first approximation, the tire contact becomes longer, more tire profile is pressed on the roadway 13 so that the dynamic rolling radius becomes smaller in the error case Rf. However, because the faulty wheel is moved along at the same vehicle speed Vf as the proper wheel, an angular speed Wf will be achieved for the defective wheel corresponding to the above-mentioned formula being in excess of the angular speed Wo of the proper wheel. Because the wheel angle speed is reflected in the wheel signals, an information with respect to the tire pressure may thus be gathered from the wheel signals. However, precautions must be taken to avoid wrong detections.

It is a strategy known in the art to determine a test quantity with respect to the wheel radii of all wheels of the vehicle, and to check it then. The determination is effected so that an average of the disturbance variables may be formed, if necessary. Instead of the wheel radii, equivalent values may be used, for example, the wheel angle speeds (inversely proportional to the respective wheel radii) or the reverse value of the wheel angle speeds (directly proportional to the wheel radii).

Cornering maneuvers are e.g. considered as disturbance variables. The wheels on the outward side of the bend have to cover a greater radius than those on the inward side of the bend so that the wheels on the outward side of the bend will exhibit a higher frequency of their wheel signals, without this fact being due to a pressure drop in a tire. Traction slip is another disturbance variable. The wheels on the driven axle will have a low slip so that also these wheels have a higher circumferential speed compared to the non-driven wheels, without this fact being due to a tire pressure loss on the wheels of the driven axle.

One test variable which, in a certain way, is insusceptible to such disturbances may e.g. be determined as follows:

$$PG = \frac{W1 + W3}{W2 + W4}$$

wherein W1 is the angular speed of the wheel 14 in the vehicle 10 of FIG. 2, W2 is the angular speed of the wheel 15, W3 is the angular speed of the wheel 16, and W4 is the angular speed of the wheel 17. A diagonal pair combination of the wheels, summation within the pairs, and calculation of quotients of the sums is effected. This way, at least some systematic faults will be averaged which are not due to tire pressure drops. The test variable may then be checked in its value. Conclusions with respect to tire pressure conditions may be drawn therefrom. In the ideal case (all wheels are of equal size and have a correct pressure), the quotient is 1. When one wheel loses pressure, its radius or angular speed will vary, and accordingly also the quotient will differ from the ideal value. Details concerning tire pressure conditions may be inferred from the direction of the discrepancy. When e.g. in the above-mentioned formula the test quantity is different from the normal value 1 and now adopts value 1.1, this can mean that either the angular speed of one of the wheels 1 or 3 has increased or that the angular speed of one of the wheels 2 or 4 has decreased. The latter may also occur, for example, when the sun shines on a tire, the said is heated thereby, its inner pressure and, hence, its radius rises and its angular speed decreases.

However, the above-mentioned method also is susceptible to disturbances in some respects.

BRIEF SUMMARY OF THE INVENTION

An object of the present invention is to provide a method and device for the detection of a pressure drop in a tire of a wheel having a reliable operation.

This object is achieved by a method of detection of a pressure drop in a tire of a wheel, comprising the following steps:

determining a test variable from the wheel radii or from variables representing these wheel radii of the wheels of the vehicle, wherein the test variable is a quotient of two sums of each two wheel radii or variables representing these wheel radii of each one pair of vehicle wheels, comparing the test variable with a threshold value, and detection of a pressure drop with respect to the result of the comparison, several test variables are determined with respect to several different wheel pair combinations, and pressure drop is considered to have been identified only if a defined vehicle wheel is identified by all found test variables as a wheel with a possible pressure drop.

According to the present invention, several test variables are determined with respect to several different wheel pair combinations, and a pressure drop is considered to have been identified only if a defined vehicle wheel is identified by all found test variables as a wheel with a possible pressure drop.

It is possible to employ the method insofar in a two-stage way as initially only one test variable is determined, and only if this test variable indicates a possible pressure drop will further test variables be determined and evaluated.

The different pair combinations may be: corresponding to the vehicle diagonals, corresponding to the vehicle axles, corresponding to the vehicle sides.

The test variable(s) can be determined with respect to possibly learnt correction values. The correction values can be dependent on driving dynamics so that also the correction of the test variable is carried out in dependence on driving dynamics.

When comparing the test variable, time considerations may also be taken into account, for example, to such effect as to whether the test quantity has reached or exceeded the threshold value for a defined time portion within a defined period of time, or whether the test variable has reached or exceeded the threshold value beyond a defined period of time. Only if these time conditions are also satisfied will it be considered as an identification that a threshold value has been reached or exceeded, while single events will not yet cause this identification.

DETAILED DESCRIPTION OF THE PREFERRED EMBODIMENTS

Figure 3:
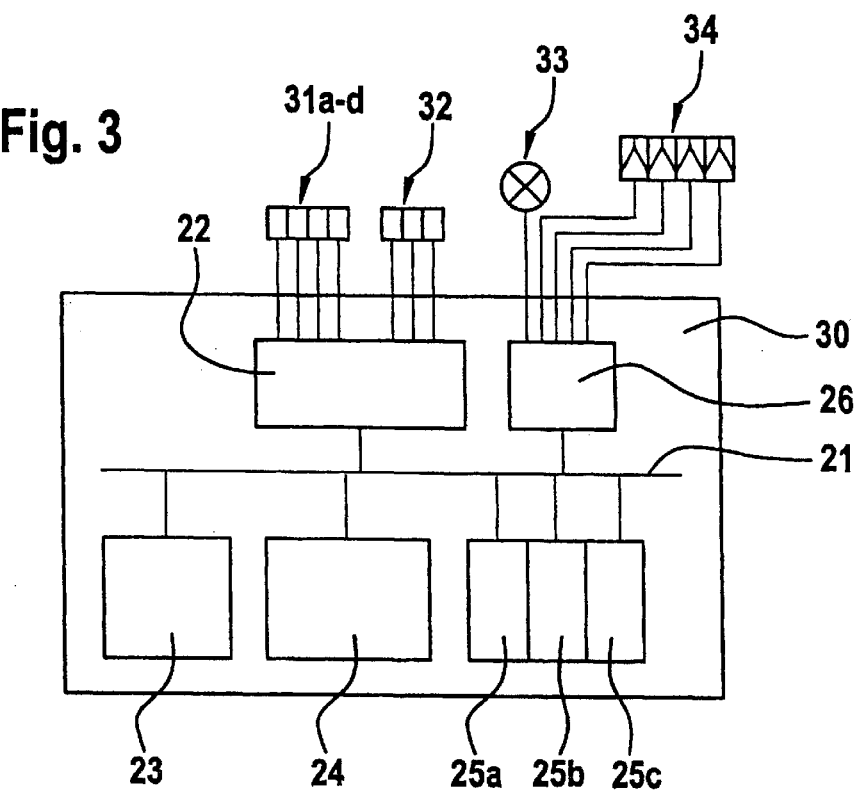
FIG. 3 is a block diagram of a detection device of the present invention.

FIG. 3 schematically shows a detection device 30. It is connected to sensor means 31, 32 and actor means 33, 34. The sensor means especially comprises wheel sensors 31a–d (one wheel sensor per wheel). Apart therefrom, further sensors may be provided, e.g. for driving dynamics, such as for longitudinal acceleration, transverse acceleration, but also for gear units, engine rotational speed, etc. The actor means may especially comprise valves 34 for brake control, these valves being provided on each individual wheel. There may also be provision of acoustic and/or optical output devices 33. The detection device 30 itself includes an input interface 22 for the sensor means and an output interface 26 for the actor means. The input interface 22 may comprise signal conversion, and as the case may be, still necessary analog/digital conversion, filter operations, standardization of signals. The device 30 includes an internal bus 21 to which the mentioned interfaces 22, 26 are connected. Besides, a read-only memory 23 (ROM) is provided, a processor unit 24 (CPU), and a volatile memory 25. The last mentioned components are also connected to the bus 21.

Programming codes and constant values used may be stored in ROM 23. The volatile memory 25 may have different areas, e.g., 25a and 25b as RAMs and 25c as register set. The data communication with the sensor means and the actor means as well as internally can be controlled by an appropriate control, for example, by way of interrupts.

Figure 1:
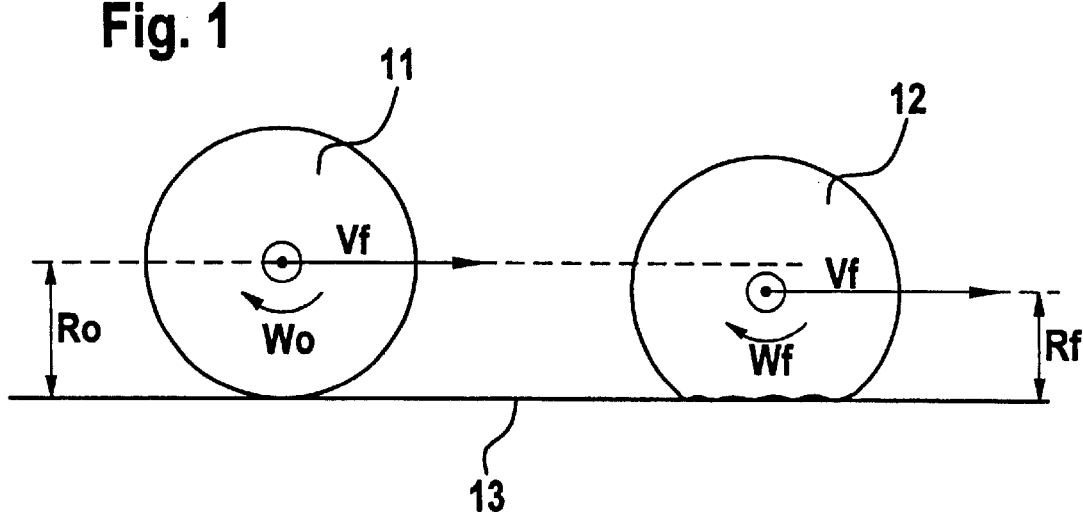
FIG. 1 is an illustration to explain the principle of pressure drop detection.
Figure 2:
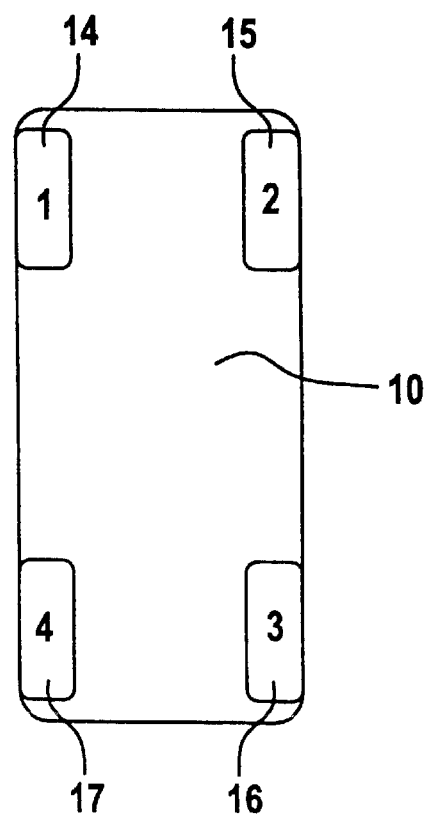
FIG. 2 is an illustration to explain the pair combinations of wheels.

Test values may be determined especially with CPU 24 in the device 30. A test value is determined for a defined wheel pair combination. FIG. 2 shows possible wheel pair combinations P1, P2, and P3. Each of these pair combinations has a first pair pi and a second pair p2. A first pair combination may extend along the vehicle diagonals. The first pair pi will then comprise the wheels 1 and 3 (left front and right rear), the second pair p2 comprises the wheels 2 and 4 (right front and left rear). A second wheel pair combination P2 may be chosen along the vehicle axles, and a third pair combination P3 may be corresponding to the vehicle sides. Details can be taken from the table in FIG. 2. The test value can be determined with respect to wheel radii or quantities which represent the wheel radii (e.g., the wheel speed) of all wheels of the vehicle. For a defined pair combination (e.g. P1), the respective pair values can be linked for the wheels of the individual pairs. The two single quantities which result (one for the first pair p1, another for the second pair p2) are then combined to form the test variable PG. The following formula may be applied:

$$PG = \frac{Wp1r1 + Wp1r2}{Wp2r1 + Wp2r2}, \quad (1)$$

wherein Wp1r1 is the speed of the first wheel of the first pair, Wp1r2 is the speed of the second wheel of the first pair, Wp2r1 is the speed of the first wheel of the second pair, and Wp2r2 is the speed of the second wheel of the second pair.

For the pair combination P1, the test variable would then be calculated according to the following formula:

$$PG = \frac{W1 + W3}{W2 + W4}, \quad (2)$$

wherein W1 designates the angular speed of the wheel 1 in FIG. 2, etc. For the other pair combinations, similar formulas will then be achieved for the respective test variable.

It can be recognized that the wheel radii or quantities which represent these wheel radii of all wheels are included in a test variable which is determined as above. When it is assumed that a simultaneous pressure drop is very unlikely to occur on two wheels, the existence of pressure drop can thus be detected qualitatively by checking this single test variable. It can further be seen that in the indicated formulas in the ideal case (all wheels have an identical diameter) the test variable has the value 1 because the input values of the quotients are equal in each case. Thus, the existence of pressure loss can be considered as having been detected if the test variable differs from the value 1.

Figure 5:
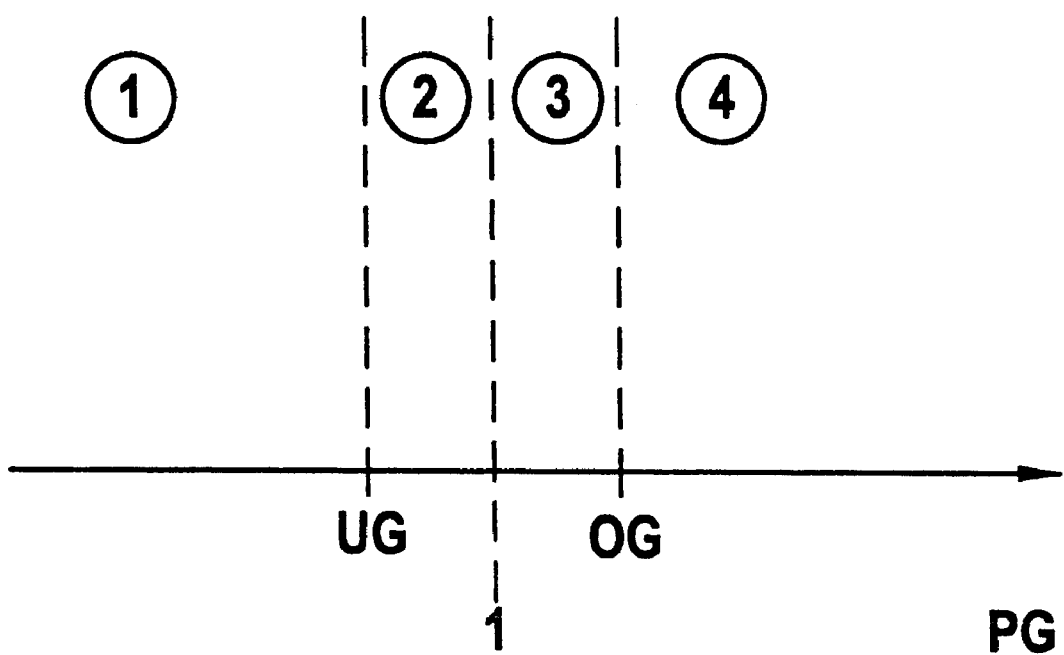
FIG. 5 is a diagram to illustrate the meaning of a test variable.

However, discrepancies are allowed to avoid wrong detections. This is represented in FIG. 5. A test variable has the ideal value 1. Differences pointing downwards until a bottom limit UG and differences pointing upwards until a top limit OG would not lead to a detection or assumption of pressure drop. Only significant deviations can be sensed. This means that in FIG. 5 the ranges (2) and (3) would be tolerance ranges around the standard value (e.g. standard value ±0.8 to 1%), while the ranges (1) and (4) would be ranges in which a pressure drop is considered to have been identified or such a pressure drop is assumed.

It may also be gathered from the above mentioned formulas that the pair in which pressure drop prevails may be inferred from the direction of the discrepancy. When it is assumed that e.g. calculations are made with angular speeds in formula (2), the result of a pressure drop is that a value higher than normal exists either in the numerator or the denominator of the fraction. Accordingly, an upward or downward deviation is the result. Or, in other words, once the test variable in FIG. 5 is in the range (1), this would mean that high values have occurred in the denominator. The denominator was produced by the angular speeds of the wheels 2 and 4. Accordingly, pressure drop would prevail either on wheel 2 or on wheel 4. If, on the other hand, the test variable is in the area (4), this would mean that high values have occurred in the numerator. This would mean that a pressure drop prevails either on wheel 1 or on wheel 3 in FIG. 2. However, a disintegration of single wheels is normally not possible in this regard.

Figure 4:
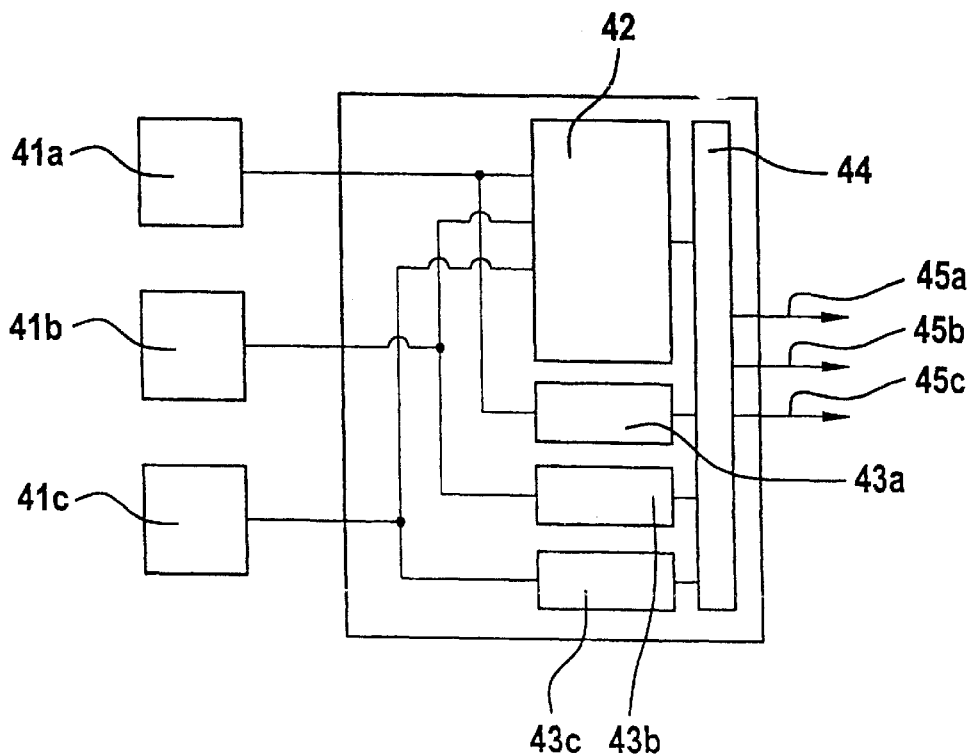
FIG. 4 is a logic diagram to illustrate the detection logic for the pressure drop detection.

To prevent wrong detections to the greatest extent possible, a logic 42, 44 is provided which performs a detection of a pressure drop with respect to several different test variables (test variables relating to different wheel pair combinations. This is schematically shown in FIG. 4. The different test variables are represented in blocks 41a–c, for example, one for each one of the pair combinations P1 to P3 in FIG. 2. Logic 42 receives all test variables and evaluates these. It considers a pressure drop as having been identified only if a defined vehicle wheel has proved by all test variables that it is the wheel with a possible pressure drop.

The operation is explained by way of the following example. It is assumed that the right front wheel 15 in FIG. 2 (wheel No. 2) suffers from pressure drop and therefore has a higher angular speed W2. Further, it is assumed that test variables PG1, PF2, and PG3 corresponding to the pair combinations P1, P2, and P3 of the table in FIG. 2 are determined by way of the angular speeds and with reference to the above-mentioned formula (1). Due to the increased angular speed of wheel 2, the test variable PG1 would hence have a value lower than 1, the test variable PG2 would have a value higher than 1, and the test variable PG3 would again have a value lower than 1, depending on whether the angular speed pertaining to wheel 2 is placed in the numerator or in the denominator of the fraction. From the test variable PG1 the logic 42 would infer that wheel 2 or 4 exhibits a pressure drop. From test variable PG2 the logic 42 would infer that the wheel 1 or 2 suffers from pressure drop, and from test variable PG3 the logic 42 would infer that the wheel 2 or 3 suffers from a pressure drop. All single comparisons thus show the wheel 2 as a possible candidate. Because all test variables point to a common wheel with a possible pressure drop, a pressure drop is considered as having been identified. If necessary, the wheel may also be identified and exposed accurately.

Different measures may be taken in response to the detection of the pressure drop: a defined warning can be output to make the driver aware of the situation. The warning may be an optical or acoustic alarm. In addition, control strategies for the vehicle dynamics or control parameters for the vehicle dynamics can be conformed to the new situation in order to comply with the changed (less favorable) conditions.

In a variation, at first only one single test variable can be determined (e.g. with reference to the pair combination P1 in FIG. 2, formula 2). Only when a pressure drop is suspected (because the value of the test variable PG1 in FIG. 5 is either in the area (1) or in the area (4)) will the further test variables PG2 and PG3 be determined and evaluated. This prevents an unnecessary continuous calculating effort and, hence, usage of system resources.

Correction values may be provided for the test variables found as described hereinabove. The correction values may be static and dynamic correction values. Static correction values take different tire geometries into account. It cannot always be assumed that all tires have the same diameter. For example, one tire may be worn to a greater extent than another one so that its diameter is reduced. Also, emergency wheels may have other diameters. Such slowly occurring changes (or changes of long duration) can be learned and used as a correction value for the test variable. The correction of the threshold value by way of which the test variable is polled is equivalent. In addition, driving-dynamics-responsive corrections for the test variable can be determined, for example, in order to compensate for effects due to curve dynamics or wheel slip. The corrected test variables are then compared to the threshold value, or test variables are compared to corrected threshold values.

Time considerations may also be effected in the comparison of a (possibly corrected) test variable with a (possibly corrected) threshold value. The objective is to prevent that a single, brief signal runaway causes a wrong decision. Thus, it may e.g. be checked whether the test variable within a defined time window has reached or passed the threshold value for a defined time portion within the window. It may also be checked whether the reaching or passing of the threshold value continues without interruption for a defined period of time. Only if this is the case will it be considered in a comparison as an indication that the threshold value has been reached or passed.

If the above-mentioned time considerations take place, the time periods or windows for corrected test variables may be set to be shorter than those for non-corrected test variables.

If both corrected and non-corrected test variables prevail, it is also possible to perform the mentioned time considerations only for non-corrected test variables, while pointwise comparisons are carried out with corrected test variables.

Beside the logic 42, 44 for the evaluation of all found test variables, evaluations or logic parts 43a, 43b, and 43c or comparison devices for the individual test variables may be provided which, in turn, perform certain tests. The result of these individual examinations 43a–c is taken up by the output logic 44 and linked to form output signals 45. 45a may be an output signal that triggers a warning. 45b may be a flag which acts qualitatively on internal operations (e.g. selection of parameter sets, selection of control strategies), and 45c can be a quantitative signal which makes available quantitive data about the tire pressure drop (wheel, extent of pressure drop, etc.).

The method of the present invention and the corresponding device does not only permit detecting a variation of the dynamic rolling radius and the speed variation of a wheel caused thereby. It also becomes noticeable whether this wheel rotates more quickly or slowly than the others. A higher wheel speed is assessed as an obvious hint at a pressure drop. A slower rotation of a wheel in comparison to the rotational speeds of the other wheels, however, is considered either as normal and, therefore, not at all as an indication of a pressure drop, or it is considered as an indication of a pressure drop only if the discrepancy exceeds a relatively high limit value $th_3$ compared to the speeds or the dynamic rolling radii $\Delta R_{dyn}$ of the other wheels.

$\Delta R_o$ is the normal value of the dynamic rolling radius in the situation under review. A discrepancy of the dynamic rolling radius $\Delta R_{dyn}$ of smaller 0.8 to 1% of the faster running wheel from the dynamic rolling radii of the other wheels is considered to lie within the tolerance, a higher discrepancy of the dynamic rolling radius $\Delta R_{dyn}$, i.e., a value of the dynamic rolling radius $\Delta R_{dyn}$, which lies above the limit value $th_1$ is assessed, however, as being an indication of pressure drop.

It was found out that, contrary to the usual behavior where an increase of the wheel speed occurs in the event of pressure drop in the tire, pressure drop in some tires, especially in tires adapted for use as an emergency wheel, so-called run-flat tires, leads to a lower wheel speed. Thus, the operating direction is reversed to the opposite. However, because a slower rotation may also have a natural cause, e.g. a road covered with snow on one side ($\mu$-split) the threshold $th_3$ for the detection of a pressure drop with a wheel rotating more slowly is set to be relatively high. The area between the limit values $th_2$ and $th_3$ is therefore quasi cut out of the range of identification.

In a defined embodiment, the logic 42 may therefore perform a poll not only with respect to whether all test variables exhibit one wheel as being faster (which means wheel 2 in the above-mentioned example), but also with respect to whether all test variables exhibit one wheel as being slower. Similar to the above-mentioned example, the said examination of all test variables with respect to a wheel that runs too slowly can lead to identify one single wheel as a wheel that runs too slowly. This may serve as a detection of a pressure drop and lead to the same or similar measures as described hereinabove.

The entire system can be implemented as a digital system. The individual system components (functionally, not with regard to hardware) may be designed so that they are distributed to various hardware components and their coordination is handled by an appropriate operating system.

What is claimed is:

1. A method of detecting pressure drop in a tire of a vehicle having a plurality of tires, comprising the steps of:
   a) determining a test variable value for each respective vehicle tire, each said test variable being a function of its associate tire's pressure, or a variable which is a function of tire pressure;
   b) placing two test variable values in a first group;
   c) placing two other test variables in a second group;
   d) adding the test variables in the first group;
   e) adding the test variables in the second group;
   f) dividing the sum derived in step d) by the sum derived in step e);
   g) comparing the quotient derived in step f) with a predetermined nominal tire pressure threshold value;
   h) placing two test variables in a third group, wherein the two vehicle tires represented in the third group are different than the two vehicle tires represented in the first group;
   i) placing two test variables in a fourth group, wherein the two vehicle tires represented in the fourth group are different than that two vehicle tires represented in the second group;
   j) adding the test variables in the third group;
   k) adding the test variables in the fourth group;
   l) dividing the sum derived in step j) by the sum derived in step k);
   m) comparing the result of step l) with a predetermined nominal tire pressure threshold value;
   n) comparing the results of step g) with the result of step m) to determine if the results of step l) and step m) exceed said nominal tire pressure threshold value, and if a vehicle tires is common to at least two of said groups used in steps b), c), h), or i).

2. Method as claimed in claim 1,
   wherein a pressure drop is considered to have been detected only if a defined vehicle wheel is detected as a faster turning wheel.

3. Method as claimed in claim 2,
   wherein a pressure drop is considered to have been detected only if the discrepancy of the rotational speed of the faster turning wheel from the rotational speed of the other wheels or the discrepancy of the dynamic rolling radius ($\Delta R_{dyn}$) from the dynamic rolling radii of the other wheels exceeds a predetermined threshold value ($th_1$).

4. Method as claimed in claim 3,
   wherein as a limit value ($th_1$) a discrepancy of the dynamic rolling radius ($\Delta R_{dyn}$) of roughly 0.8% to 1% from the dynamic rolling radii ($\Delta R_{dyn}$) of the other wheels is predetermined.

5. Method as claimed in claim 1,
   wherein a pressure drop is considered to have been detected when a defined vehicle wheel is identified as a faster turning wheel or a slower turning wheel compared to the remaining vehicle wheels.

6. Method as claimed in claim 5,
   wherein a pressure drop is considered to have been detected only if the discrepancy of the rotational speed of the wheel turning faster or more slowly or the discrepancy of the dynamic rolling radius ($\Delta R_{dyn}$) of the faster or slower turning wheel from the dynamic rolling radii of the remaining wheels exceeds predetermined limit values ($th_1$, $th_3$).

7. Method as claimed in claim 6,
   wherein as a limit value ($th_1$) for the detection of a pressure drop of a faster turning wheel, a discrepancy of the dynamic rolling radius ($\Delta R_{dyn}$) of this wheel of roughly 0.8% to 1% from the dynamic rolling radii ($\Delta R_{dyn}$) of the remaining wheels is predetermined, and as a limit value ($th_3$) for the detection of a pressure drop of a wheel turning more slowly a discrepancy of the rolling radius of this wheel of roughly 15% is predetermined.

8. Method as claimed in claim 7,
   wherein a first test variable is determined initially with respect to a first wheel pair combination, and further test variables are determined with respect to further wheel pair combinations only if the comparison of the first test variable provides an indication of a pressure drop.

9. Method as claimed in claim 8,
   wherein the two pairs of wheels at the vehicle diagonal represent the first wheel pair combination.

10. Method as claimed in claim 1, wherein said first test variable is for a first wheel pair combination concerning the two pairs of wheels at the two vehicle diagonals, wherein the second test variable is for a second wheel pair combination concerning the two pairs of wheels on the two vehicle sides, and wherein the third test variable is for a third wheel pair combination concerning the two pairs of wheels at the two vehicle axles.

11. Method as claimed in claim 1,
    wherein the test variable of step a) are determined with respect to correction values that are learned.

12. Method as claimed in claim 1,
    wherein when a quotient is compared with a threshold value, considerations are made over a defined period of time or by way of statistical analysis.

13. Method as claimed in claim 12,
    wherein the period of time used to determine learned correction values is shorter than the period of time needed to determine non-corrected test variables.

14. Method as claimed in claim 1,
    wherein a test variable PG is determined with respect to the formula $$PG = \frac{Wp1r1 + Wp1r2}{Wp2r1 + Wp2r2},$$

wherein Wp1r1 is the speed of the first wheel of the first pair, Wp1r2 is the speed of the second wheel of the first pair, Wp2r1 is the speed of the first wheel of the second pair, and Wp2r2 is the speed of the second wheel of the second pair.

* * * * *

UNITED STATES PATENT AND TRADEMARK OFFICE
CERTIFICATE OF CORRECTION

PATENT NO. : 6,691,059 B1 Page 1 of 1
DATED : February 10, 2004
INVENTOR(S) : Griesser, M.

It is certified that error appears in the above-identified patent and that said Letters Patent is hereby corrected as shown below:

Column 7,
Line 21, please change "its associate" to -- its associated --.

Signed and Sealed this

Eighth Day of June, 2004

JON W. DUDAS
*Acting Director of the United States Patent and Trademark Office*